United States Patent [19]

Carr

[11] Patent Number: 5,066,034
[45] Date of Patent: Nov. 19, 1991

[54] CAR TOWING APPARATUS WITH SURGE BRAKE

[75] Inventor: Larrey Carr, Lodi, Calif.

[73] Assignee: Gene Heiden, a part interest

[21] Appl. No.: 495,086

[22] Filed: Mar. 19, 1990

[51] Int. Cl.⁵ .............................................. B60T 7/20
[52] U.S. Cl. ................................ 280/428; 280/420; 188/3 H
[58] Field of Search ............... 280/420, 421, 428, 432; 188/3 H

[56] References Cited

U.S. PATENT DOCUMENTS

| 3,570,633 | 3/1971 | Garnett | 280/428 X |
| 3,650,570 | 3/1972 | Meeks | 280/421 X |
| 4,249,643 | 2/1981 | Yoder | 188/3 H X |
| 4,471,973 | 9/1984 | Beckmann, Sr. | 280/511 X |

Primary Examiner—Charles A. Marmor
Assistant Examiner—Alan M. Kager
Attorney, Agent, or Firm—Mark C. Jacobs

[57] ABSTRACT

Car towing apparatus having a surge brake system on a tow bar adapted to be coupled to the brakes of the towed vehicle to actuate the same upon actuation of the brakes of the towing vehicle.

13 Claims, 5 Drawing Sheets

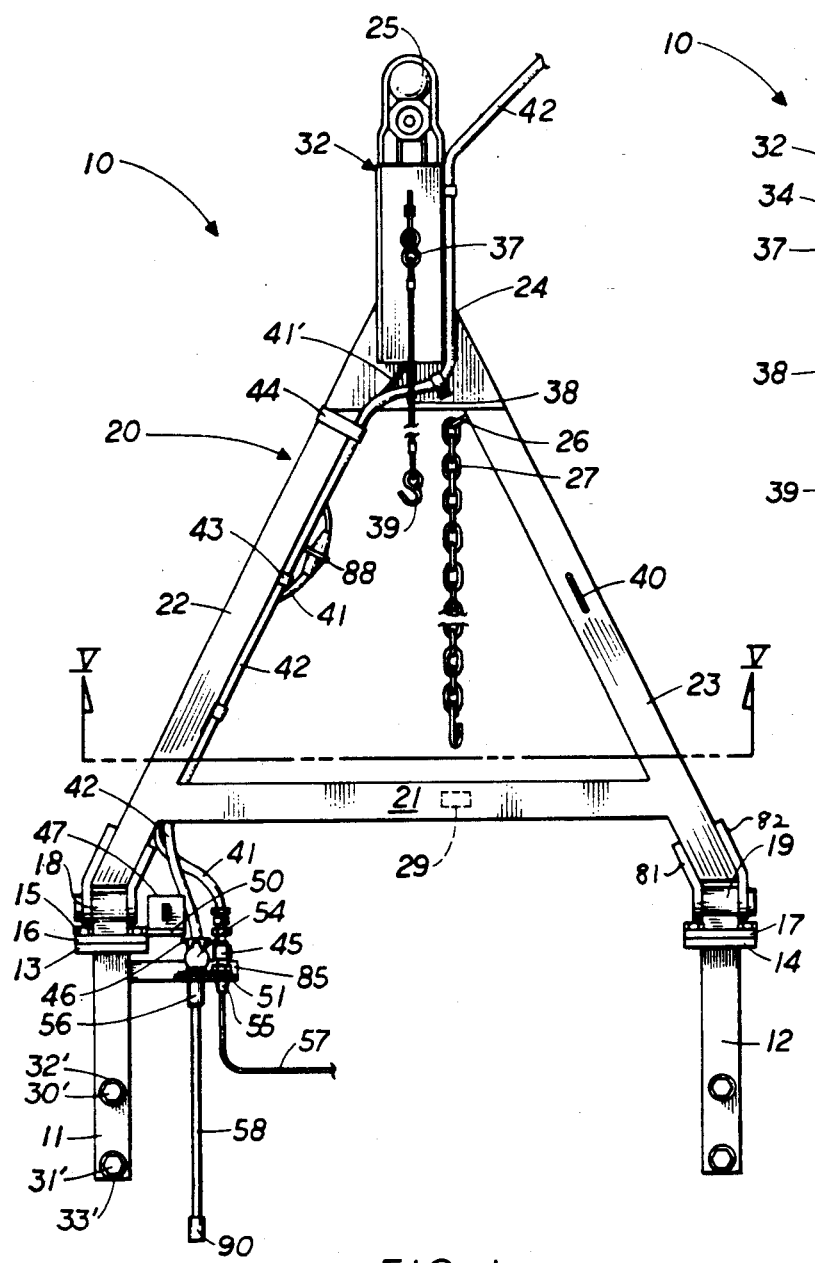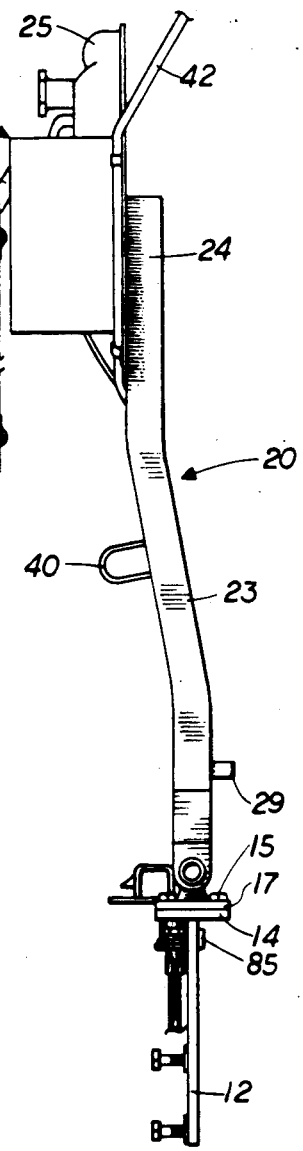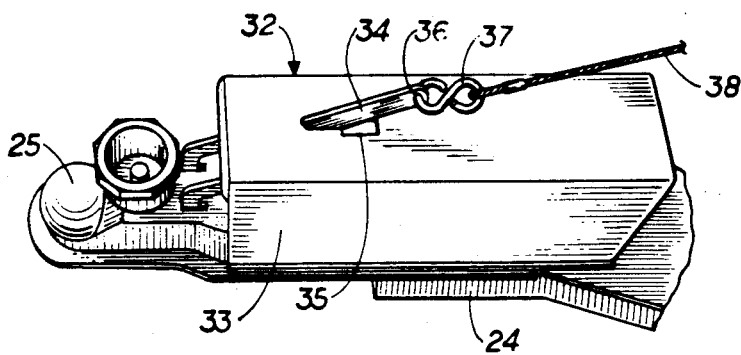
FIG. 1
FIG. 2
FIG. 3

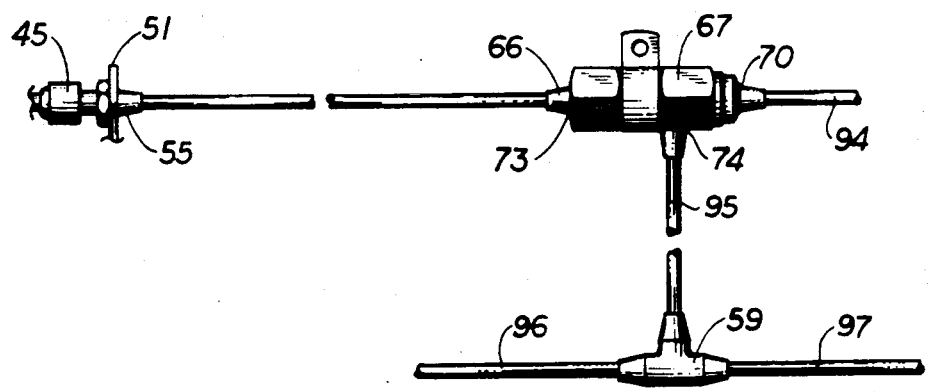
FIG. 8
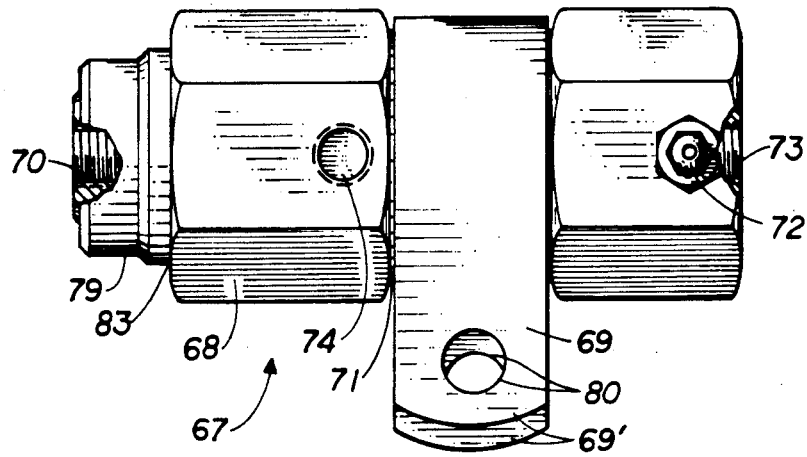
FIG. 9
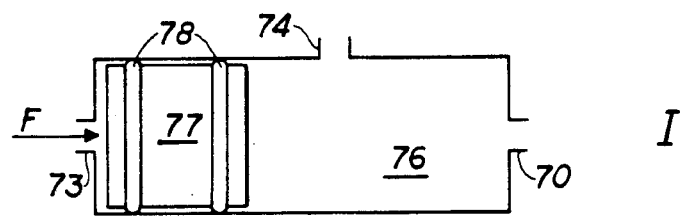
I
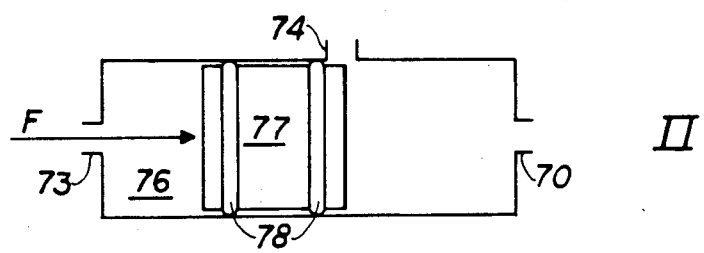
II
FIG. 10
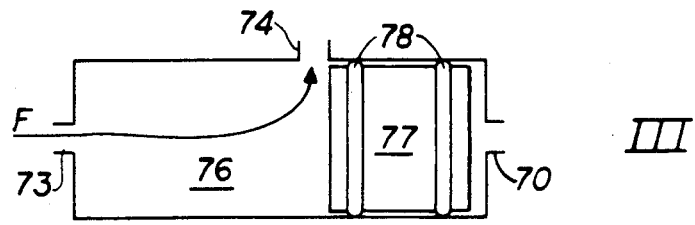
III

CAR TOWING APPARATUS WITH SURGE BRAKE

BACKGROUND OF THE INVENTION

1. Field of the Invention

The invention relates to vehicle towing apparatus; and, more particularly, to apparatus for towing a vehicle having a surge braking system incorporated therein.

2. Description of the Prior Art

In my U.S. Pat. No. 4,761,015, I disclosed a vehicle towing apparatus which can be stowed under the undercarriage of a tow vehicle which can be used to tow a vehicle, particularly a front wheel drive vehicle, without adding to the mileage of the vehicle.

However, in my patent, there is no provision for automatically braking the towed vehicle as a result of surges encountered during towing. There is a need for a tow bar having a surge braking system built-in which system is automatically engaged to brake the towed vehicle when the towing vehicle is braked.

SUMMARY OF THE INVENTION

It is an object of this invention to provide car towing apparatus with a surge brake.

It is a further object of this invention to provide apparatus for towing a car having a built-in surge brake system for automatically braking the towed vehicle when surges are encountered.

These and other objects are preferably accomplished by providing a tow bar having a surge brake system thereon adapted to be coupled to the brakes of the towed vehicle to actuate the same upon actuation of the brakes of the towing vehicle.

BRIEF DESCRIPTION OF THE DRAWING

FIG. 1 is a top plan view of a hitch in accordance with the teachings of the invention;

FIG. 2 is a side elevational view of the hitch of FIG. 1;

FIG. 3 is a perspective view of the end alone of the hitch of FIGS. 1 and 2 to be coupled to the towing vehicle;

FIG. 8 is a top perspective view of the actuator associated with the apparatus of the invention;

FIG. 9 is an elevational view of the actuator alone of FIGS. 1 and 8 removed from the apparatus for convenience of illustration;

FIG. 10 are diagrammatic side views of the actuator of FIG 9 showing alternative fluid flow.

DESCRIPTION OF THE PREFERRED EMBODIMENT

Figure 4:
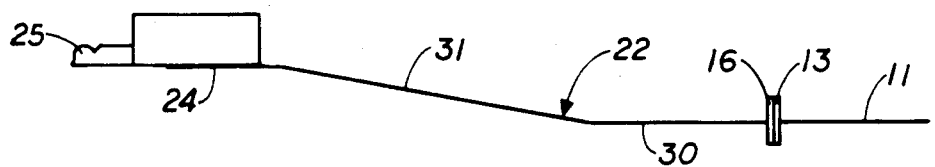
FIG. 4 is a diagrammatic side view of the hitch of FIGS. 1 to 3.

Referring now to FIG. 1 of the drawing, a tow bar or hitch 10 is shown having a pair of spaced arms 11, 12 integral with spaced vertical plates 13, 14, respectively. Plates 13, 14 are for example rectangular and may be bolted via bolts 15, or otherwise secured, to like mating vertical plates 16, 17, respectively. A pair of pivot loops 18, 19 are integral with and extend forwardly from each plate 16, 17, respectively. The pivot pins for 18, 19 are not seen which connect spaced apertured flanges 81, 82 on opposite sides of legs 22, 23 with pivot loops 18, 19.

A yoke portion 20 comprises the remainder of hitch 10 and includes a cross bar 21 (FIG. 1) interconnecting two legs 22, 23. Legs 22, 23 intersect at an elongated portion 24 (completing the Y or yoke-shaped configuration) having a conventional ball coupling member 25 (see FIG. 3) thereon for coupling hitch 10 to the ball (not shown) of a towing vehicle (also not shown).

As seen in FIG. 1, an eye member 26 is provided on one of the legs, such as leg 23, on yoke portion 20, and an elongated chain 27 is coupled thereto.

As seen in FIG. 2, a U-shaped spring clip 29 may be provided on the underside of cross bar 21. Also, spaced threaded bolts 30', 31', (FIG. 1), extending through washers 32', 33', respectively, are provided in each of arm 11, 12 for reasons to be discussed. As seen in FIG. 4, plates 13, 16 are generally vertical and arms 11, 12 may extend away and downwardly from 16, 13 at an angle of a few degrees with respect to the horizontal. Legs 22, 23 are each comprised of a first portion 30 extending downwardly from plates 13, 16 at an angle with respect to the horizontal of a few degrees and an integral second portion 31 extending upwardly and outwardly away from portion 30 at an angle of few degrees with respect to the horizontal. Elongated portion 24 may be at a slight angle with respect to the horizontal and is generally co-planar with the angle of portion 30.

As particularly contemplated in the invention, surge brake means 32 are provided on hitch 10 and comprises a housing 33 (FIG. 3) mounted on top of elongated portion 24. The components of the housing 33 are conventional surge braking components well known in the art, such as the surge brakes manufactured and sold by Dico Co, Inc. of Des Moines, Iowa under the model No. 60. Thus, other than in the environment hereafter and heretofore described, the actual type of surge brake per se utilized, forms no particular part of the invention.

Figure 5:
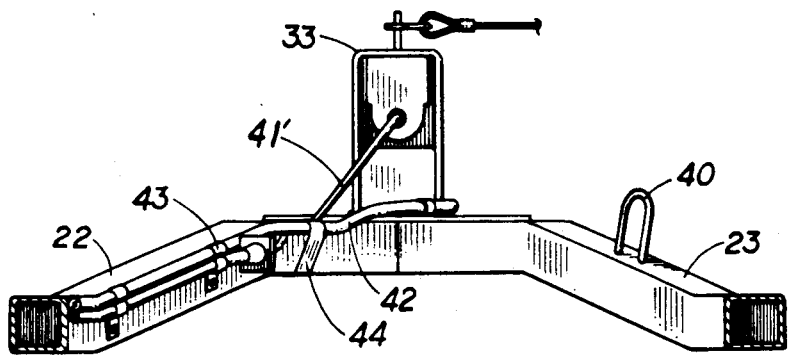
FIG. 5 is an enlarged view taken along lines V—V of FIG. 1.

Thus, surge brake housing 33 has a control lever 34 extending out of slot 35 in housing 33 for controlling the internal components thereof. Lever 34 terminates in an apertured end 36 receiving therein an S-hook 37. An elongated wire cable control line 38 is coupled to S-hook 37 and, as seen in FIG. 2, terminates in a releasable S-hook 39. As seen in FIG. 5, a U-shaped piece 40 is also provided on top of arm 23.

Wire cable 38 is a safety cable that attaches to the towing vehicle at the towing vehicle's bumper by a conventional pin mechanism. Should the ball of the hitch break loose, then the cable on being pulled locks the brakes of the towed vehicle as is known in the art, by actuating the surge brake.

As also seen in FIG. 5, a fluid conduit 41' and an electrical conduit 42 are coupled to housing 33 operatively coupled to housing 33's inner mechanism. As seen in FIG. 1, conduit 41' extends to a connector 88 where it is fluidly coupled to a fluid hose or conduit 41. These conduits 41, 42 may be secured to arm 22 by spaced clips 43 and straps 44. Each conduit 41, 42 terminates in quick release connectors 45, 46, respectively (see FIG. 2).

Figure 6:
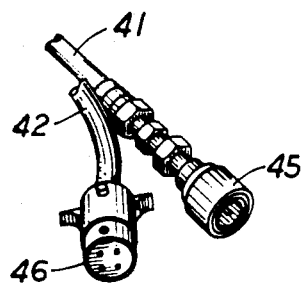
FIG. 6 is a detailed enlarged view of the ends of the cables 41, 42 of FIGS. 1 to 5.
Figure 7:
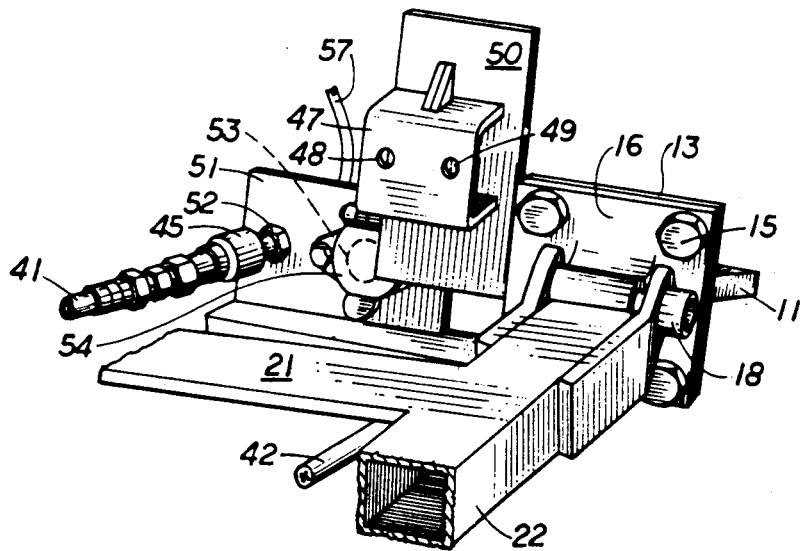
FIG. 7 is an enlarged rear perspective view of the plates 13, 16 associated with arm 11.

As seen in FIG. 7, a vertical flange plate 50 is secured to plate 16 and a U-shaped bracket 47 with spaced holes 48, 49 therethrough is secured to plate 50. A second vertical flange plate 51 is secured to a horizontal plate 85, which is mounted on arm 11, per FIG. 1. Horizontal plate 51 has a connector 52 for coupling connector 45 of conduit 41 thereto. (See FIG. 7) A like connector 53 (shown in dotted lines) normally covered by cover plate 54 is also provided on plate 51. As seen in FIG. 7, fluid conduit 41 is coupled to connector 52 via connector 45. Electrical conduit 42 is shown as uncoupled from connector 53 via connector 46, (FIG. 6). The plate 54 is pivotally mounted on flange plate 51.

As seen in FIG. 1, connectors 55, 56 (similar to connectors 52, 53, respectively) are provided on the other side of plate 51 for receiving conduit 57, 58, respectively. Thus plate 51 serves as an intermediate connection point for electrical and hydraulic conduits from the towing and towed cars. Conduit 57 thus provides a continuation of conduit 41, when coupled to connector 52, and conduit 58 provides a continuation of cable 42 when coupled to connector 53. Conduit 58 terminates in a quick release coupler 90. See also FIGS. 7 and 8.

Reference is now made to FIG. 8. Leading to connector 45, but undesignated in this FIG is conduit 41. Connector 45 is fluidly connected to connecter 55 of conduit 57 at plate 51. This fluid conduit terminates at connector 66 at the input end of actuator 67. See also FIG. 9, but note that the position of actuator 67 has been reversed 180 degrees.

Figure 11:
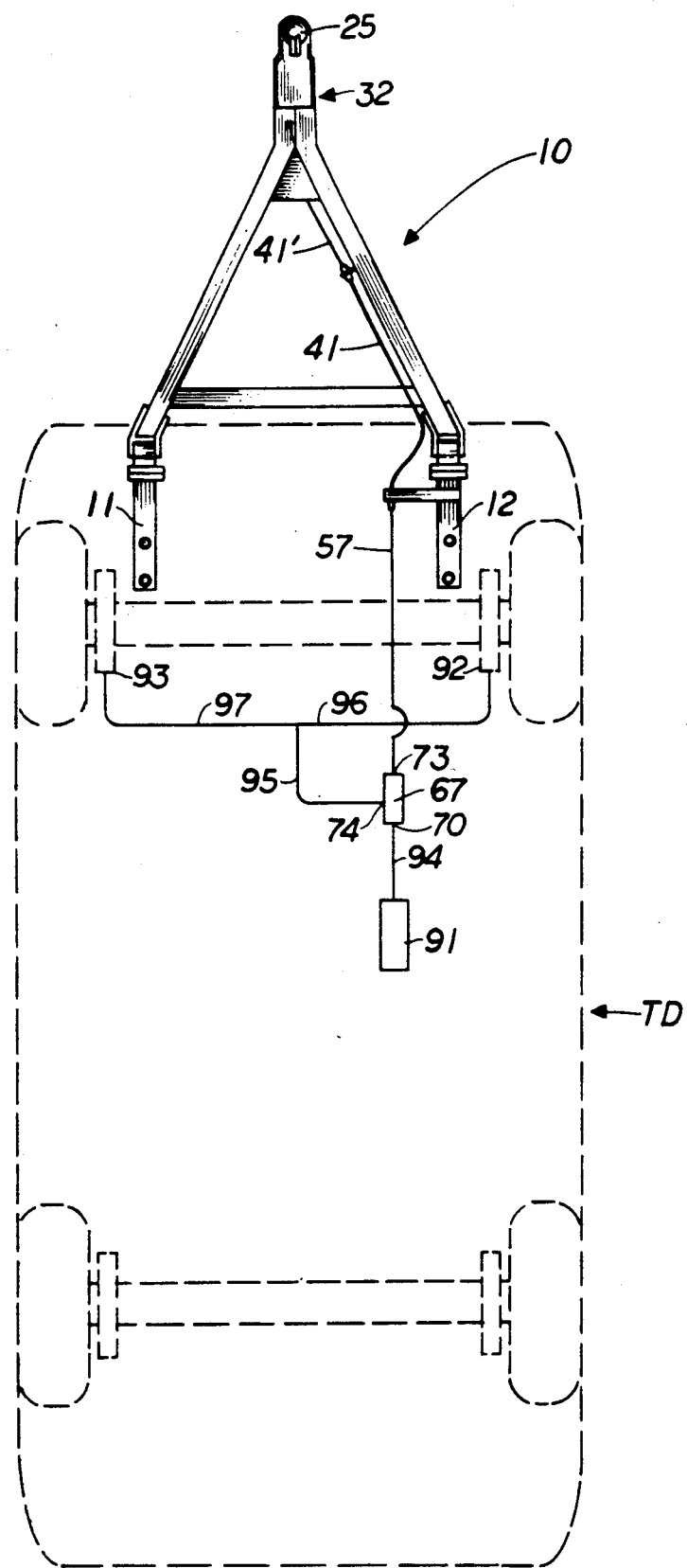
FIG. 11 is a schematic view of the apparatus of FIGS. 1 to 10 coupled to a towed vehicle.

Turning now to FIG. 9 and FIG. 11 one sees actuator 67 is a generally hexagonally shaped elongated housing 68 designated in FIG. 9 and having an apertured bracket 69 secured thereto, the apertures being designated 80 and being located in the two flanges 69'. The bracket 69 rests in an optional recess 71 of housing 68. A pair of spaced fluid inlets 70, 73 are provided on housing 68. A bleeder valve 72 is secured to housing 68 on one surface. Fluid outlet 70 communicates via line 94 to the master cylinder 91. See also FIG. 8. This connection 70 is centrally located in threaded closure 79 that closes off opening 83 of housing 68.

Figure 12:
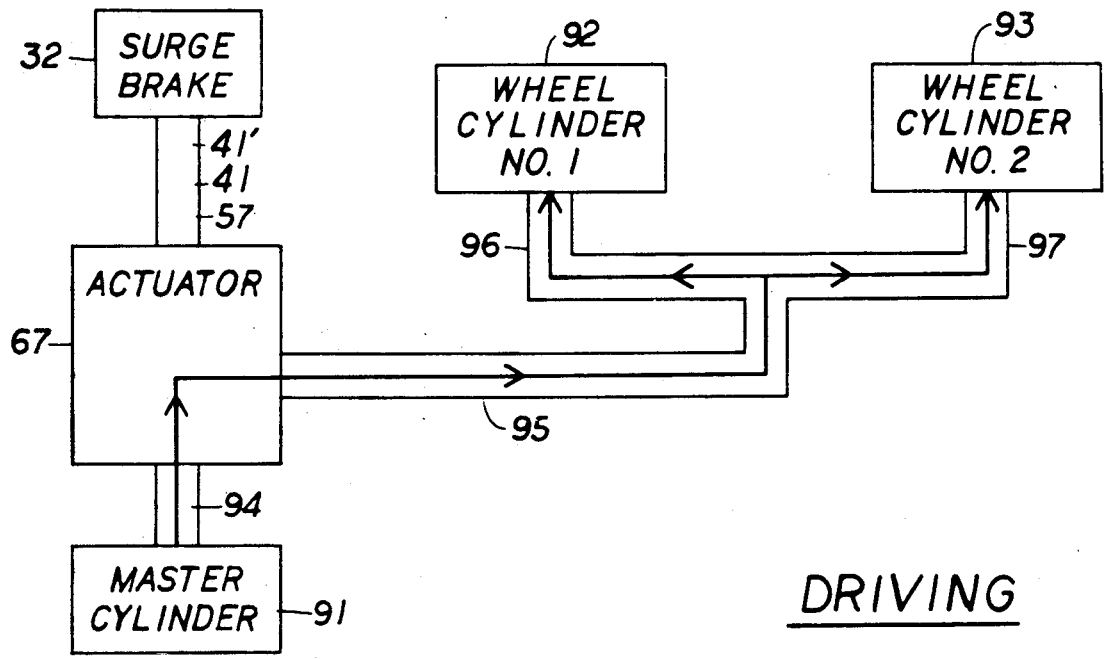
FIGS. 12 and 13 are schematic views illustrating the operation of the apparatus of FIGS. 1 to 10.

The connection that also communicates via a fluid conduit 41' and connector 52 to the surge brake is connection 73 in housing 68. Thus, fluid connection 74 on the surface of the housing 68 fluidly communicates via conduit 95 tee 59 and conduits 96, 97 to the front wheel cylinders, 92 and 93 as seen in FIGS. 8 and 12.

Reference should now be made to FIG. 10, which illustrates the mode of operation of the automatic actuator 67 in the normal operating condition, in which the towed vehicle is under operator control. Upon stepping on the brakes, brake fluid F is pumped through connector 73 into chamber interior 76. See FIG. 10-II The fluid F impacts piston 77 and moves it to the opposite end of the chamber (see FIG. 10-III). The fluid then exits out connector 74 to actuate the front wheel brakes.

When vehicle TD is not under operator control, but is being towed, obviously no person can actuate the car TD's brakes. During this time period, when the brakes of the TG towing vehicle are applied, fluid is delivered via input connector 70 into chamber 76 from the surge brake 32 in response to brake pedal actuation in the TG or towing vehicle. In such instance, piston 77 moves in the direction opposite that shown in FIGS. 10-I, 10-II and 10-III.

Conventional o-rings 78 strategically placed maintain the seal of fluid for at least the two inlet and one outlet connections of actuator 67.

MOUNTING AND OPERATION

In the discussion above and below herein the towed vehicle will be designated by the letters TD rather than numerically and the towing vehicle will be designated TG. Reference is made to FIG. 11 where a car body (TD) is shown in dashed line and the frame is excluded for ease of understanding. This depicts the mounting of the invention to the undercarriage. The discussion to follow describes both the mounting of the components, the operation during towing, and their operation during non-tow periods.

For setup, the ball coupler 25 is coupled to the ball (not shown) of the towing vehicle, TG. Hook 39 is coupled to the opposite end of cable 38 - FIGS. 3 and 5, for connection to the bumper of vehicle 76 by a pin. Arms 11, 12 extend under the frame of the vehicle being towed and conventional apertured U-shaped clips 89 (only one shown in exploded view in FIG. 1) are placed over a frame member, and secured via bolts 30', 31' to arms 11, 12. Other conventional attachment means to the car frame are also contemplated. Quick release coupler 90 (FIG. 1) of conduit 58 is coupled to a mating coupler (not shown) coupled to the brake lights of the towed vehicle for conventional towing brake light operation. Conduit 57 is in turn coupled to actuator 67 (FIG. 8) which is bolted to the frame, not shown, and which actuator is in turn coupled to the master cylinder 91 (FIG. 11) of the vehicle being towed. The master wheel cylinder 91 is in turn coupled to the wheel cylinders 92, 93 of the two front wheels of the vehicle being towed via conduits 94 to 97 as seen schematically in FIGS. 12 and 13.

Figure 13:
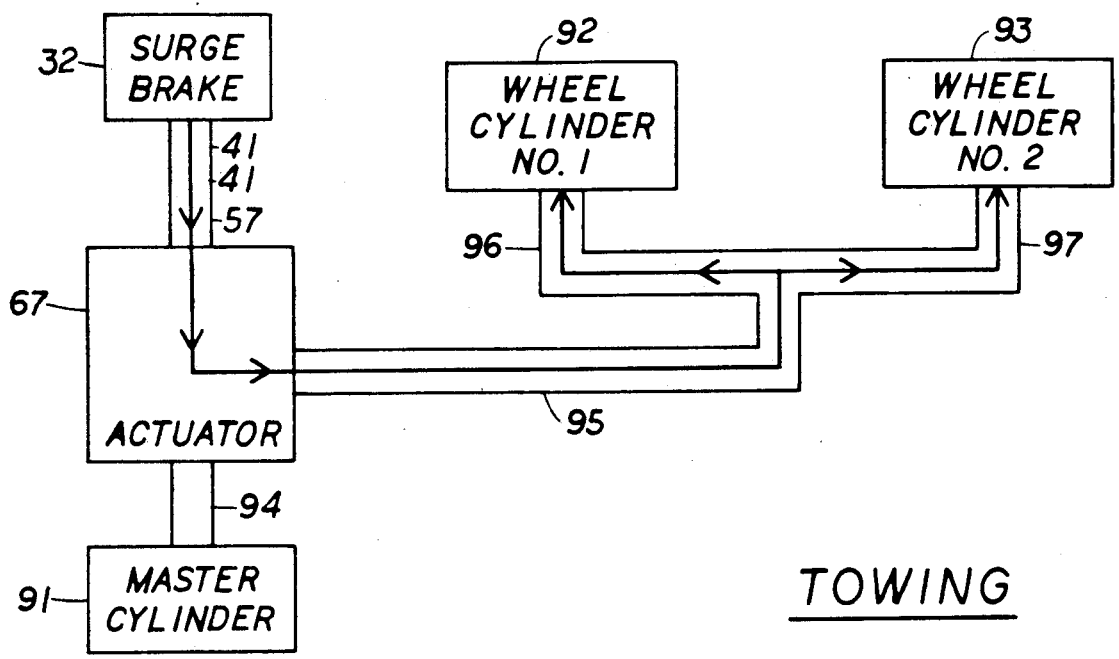

When vehicle TD is being towed, the actuator is in position II, when surge brake 32 is actuated upon braking of the towing vehicle, as seen in FIG. 13, hydraulic fluid from surge brake 32 enters conduit 41 and into actuator 67 where it passes via conduits 95 to 97 into wheel cylinders 92, 93 as indicated by the arrows. Thus, the towing vehicle applies the brakes, and the brakes of the vehicle being towed are actuated, as a result thereof.

FIG. 12 illustrates driving or non-towed operation of actuator 67. As seen in FIG. 12, brake fluid from the master cylinder 91 of the vehicle TD enters actuator 67 via conduit 94 and exits actuator 67 via conduit 95 where it passes to conduits 96 and 97 leading to wheel cylinders 92, 93, respectively. These are the normal driving conditions when not towing the vehicle. The arrows show the flow path of the brake fluid.

The conduits 96, 97 can of course be coupled to the rear wheel cylinders of the towed vehicle.

It can be seen that there is provided a tow bar having braking means for actuating the brakes of the towed vehicle. Thus, control over the stopping or braking ability of the towed vehicle is provided. When the towing vehicle, TG, brakes, the forward motion of the towing vehicle stops and actuates the surge brake means 32 which in turn actuates the brakes of the towed vehicle at substantially the same time.

When the towed vehicle TD, is not being towed, i.e. its brakes are operating under the control of the driver of the towed vehicle, actuator 67 is left in place, bolted to the undercarriage on frame of the TD vehicle. In order to place actuator 67 in condition for receiving brake fluid from the surge brake for FIG. 13 operation, one must do nothing, since the switch from operator control to surge brake control is automatic, as has been explained elsewhere herein.

Also, when the vehicle TD is not being towed arms 11, 12 remain attached to the frame, detachment is made of plates 13, 14 from plates 16, 17 by removal of bolts 15. See FIG. 4 thus the hitch 10 can be stored away during periods of non-use.

Since certain changes may be made in the above apparatus without departing from the scope of the invention herein involved, it is intended that all matter contained in the above description and shown in the accompanying drawings shall be interpreted as illustrative and not in a limiting sense.

I claim:

1. A car towing apparatus for connection to a towing vehicle for towing a driveable vehicle, having its own braking system which comprises a master brake cylinder fluidly coupled to spaced wheel cylinders, which apparatus permits said driveable vehicle's braking system to be actuated remotely during a tow and by the driver when the vehicle is being driven, said apparatus comprising:
   a frame;
   a pair of spaced elongated towed vehicle engaging supports on said frame adapted to be coupled to said towed driveable vehicle;
   surge brake means on said frame adapted to emit a flow of hydraulic fluid upon sudden stop of said frame when said frame is being towed;
   brake system actuating means on said driveable vehicle fluidly connected between both said surge brake means and the master cylinder of the driveable vehicle braking system for receiving fluid from both said surge brake means and from said master cylinder for distribution of said fluid to said wheel cylinders whereby,
   when said driveable vehicle is being driven and the driver applies the brake pedal, fluid from said master cylinder flows to said actuating means where said fluid is distributed to said wheel cylinders to stop the vehicle, and,
   when said driveable vehicle is being towed and said frame is stopped suddenly, said surge brake means actuates to deliver fluid to said actuating means which in turn distributes said fluid to said wheel cylinders to stop the vehicle.

2. In apparatus of claim 1 wherein said frame is generally triangularly shaped, the apex of said triangle having a ball socket for engaging a ball on a towing vehicle, said surge brake means being mounted at said apex and adjacent said ball socket.

3. In the apparatus of claim 2 wherein the side legs of said triangularly shaped frame provide said elongated supports, each of said supports having a plurality of spaced bolts adjustably mounted at the terminal end thereof.

4. In the apparatus of claim 1 including an electrical conduit coupled to said surge brake means, said surge brake means providing electrical current through said electrical conduit upon sudden stop of said frame, the terminal end of said electrical conduit being electrically coupled to the brake lights of said towed vehicle.

5. In the apparatus of claim 1 wherein said fluid coupling between said surge brake means and said actuator means includes a fluid conduit releasably coupled to both.

6. In the apparatus of claim 2 further comprising arms extending from said triangularly shaped frame, one of said arms having a flange plate mounted thereon, said fluid communication between said surge brake means and said flange plate being provided by a fluid conduit releasably coupled to a coupler on said flange plate said actuating means being also fluidly and releasably coupled to said coupler on said flange plate.

7. In the apparatus of claim 6 wherein said surge brake means is releasably and electrically coupled by an electrical conduit to a coupler on said flange adapted to flow electrical current through said electrical conduit upon sudden stop of said surge brake means, said actuating means also being releasably and electrically coupled to said last-mentioned coupler.

8. In the apparatus of claim 1 wherein said frame is generally triangularly shaped having a ball coupler at its apex, said spaced supports providing the side legs of said triangularly shaped frame, and a cross bar interconnecting said legs, said surge brake means being disposed on said frame adjacent said ball coupler, said apex extending in a generally horizontal plane, said supports extending from said apex first downwardly at an angle with respect to the horizontal, then upwardly and away from said apex also at a slight angle with respect thereto to said cross bar.

9. In the apparatus of claim 1, wherein said vehicle engaging supports are releasably attached to said frame, for retention on said towed vehicle for future use.

10. In the apparatus of claim 1 wherein said actuating means includes a pair of fluid inlet connections and a fluid outlet connection.

11. In the apparatus of claim 1 wherein the actuating means includes an elongated chamber, having a piston therein, one fluid inlet at each end of said chamber and a fluid outlet disposed normal to said inlets.

12. In the car towing apparatus of claim 1 wherein said brake system actuating means includes a bracket for the mounting thereof to the undercarriage of the driveable vehicle.

13. The car towing apparatus of claim 1 wherein the brake system actuating means on said driveable vehicle is removably fluidly connected to said surge brake means and permanently fluidly connected to said master cylinder.

* * * * *